UNITED STATES PATENT OFFICE.

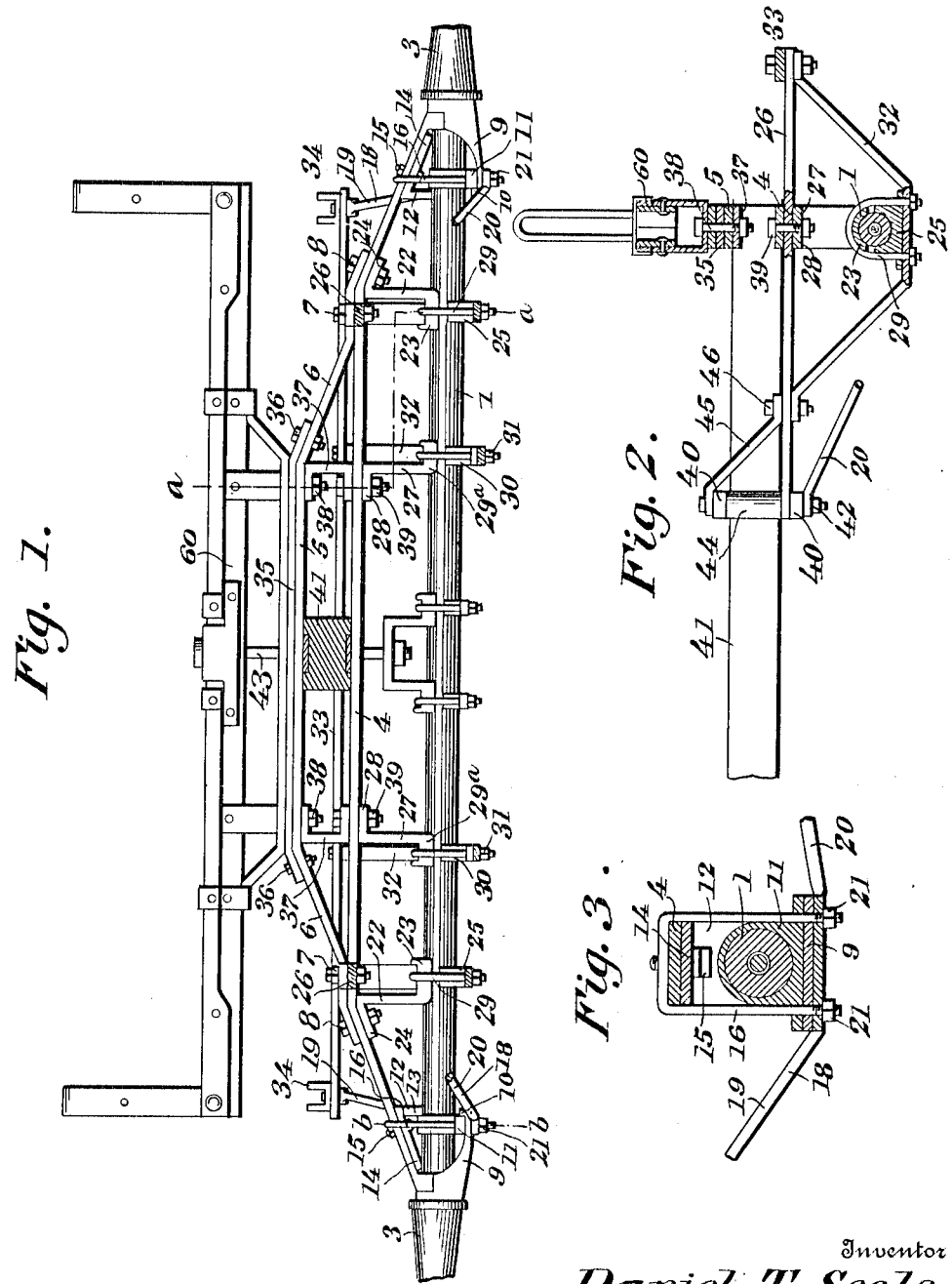

DANIEL T. SEALE, OF OZARK, ALABAMA.

WAGON-GEAR.

1,105,460.  Specification of Letters Patent.  Patented July 28, 1914.

Application filed April 29, 1913. Serial No. 764,374.

*To all whom it may concern:*

Be it known that I, DANIEL T. SEALE, a citizen of the United States, residing at Ozark, in the county of Dale and State of Alabama, have invented new and useful Improvements in Wagon-Gears, of which the following is a specification.

The object of the invention is to effect improvements in the construction of the trusses which strengthen the axles.

With the above and other objects in view, the invention consists in the construction, combination and arrangement of devices, hereinafter described and claimed.

In the accompanying drawings:—Figure 1 is a rear elevation of the front truck of a running gear the reach being shown in section. Fig. 2 is a sectional view on the plane indicated by the line $a$—$a$ of Fig. 1. Fig. 3 is a similar view on the plane indicated by the line $b$—$b$ of Fig. 1.

In the figures of the drawing a front axle is indicated at 1. Said axle is provided at its ends with skeins 3, the inner ends of which are attached at points on their upper sides to the ends of a lower spanner bar 4. An upper spanner bar 5 is arranged above the lower spanner bar of the front axle and its downturned ends 6 are secured thereto by bolts 7—8. The axle skeins have inwardly extending arms 9 on their lower sides at their inner ends which arms are provided at their inner ends with upturned flanges 10 that engage the inner sides of the clip blocks 11 which are arranged on the under side of the axle. End spacer brackets 12 which are substantially triangular in form are arranged on the upper side of the axle at the ends thereof bear under the ends of the lower spanner bar 4 and have lower arms 13. The upper arms 14 of the said spacer brackets are secured to the spanner bar 4 by bolts 15 and the spanner bar 4 is engaged by inverted U-shaped clip bolts 16, the arms of which are arranged astride of the axle and pass through openings in the lugs of the clip blocks 11 and also through openings in the intermediate portions of the brace rods 18 which have forwardly extending and converging arms 19 and also have rearwardly extending arms 20 which converge rearwardly. Nuts 21 are screwed on the lower ends of the arms of the clips bolts and hence the nuts of the lower spanner bar, the spacer blocks 12, the axle, the clip blocks 11 and the brace rods 18 are firmly secured together. Intermediate spacer brackets 22 are also arranged between the axle and the lower spanner bar and are each provided with an arm 23 at the lower end to bear on the axle and an inclined arm 24 at the upper end to bear under the inclined portion of the spanner bar. Clip blocks 25 are arranged under the axle and the rear lower ends of the side bars 26 are arranged under said clip blocks and are secured thereto by clip bolts 29 which also engage the arms 23 of the spacer brackets 22 so that said spacer brackets, side bars and clip blocks are firmly secured together. The arms 24 of the said spacer brackets are secured to the upper spanner bar by the bolts 8. Inner spacer brackets 27 which are somewhat similar to the intermediate spacer brackets 22 have arms 28 that bear under the lower spanner bar and arms 29$^a$ that bear on the axle. Clip blocks 30 are arranged against the under side of the axle below the arms 29$^a$ and secured to the axle and said arms by clip bolts 31 which also secure the rear lower ends of draft brace rods 32 in place.

The upturned front ends of the brace rods 18, side bars 26 and draft brace rods 32 are connected together by a thill coupling beam or draft beam 33 which is bolted thereto as shown and is provided at its ends with coupling yokes 34 for the reception of the eyes of the draft irons at the rear ends of the thills or pole. A cap bar 35, to reinforce the central portion of the upper spanner bar 5 is arranged on the latter and secured at its ends thereto as at 36. Spacer brackets 37 are arranged between the lower spanner bar 4 and the upper spanner bar 5 and have their upper arms secured by bolts 38 and their lower arms secured by bolts 39, the latter bolts also securing the arms 28 of the spanner brackets 26 of the spacer brackets 22 in place. The rear ends of the side bars 26 are connected together by upper and lower slide bars 40 which are, respectively, arranged on the upper and lower sides of the reach 41, the ends of the lower slide bars and the rear ends of the brace rods 18 being secured to the side bars by bolts 42. The upper slide bar is on the upper ends of said bolts 42 the latter being provided with spacer rolls 44 and brace irons 45 are also provided for the upper ends of said bolts and the upper slide bar and have their front ends secured on the side bars 26 by bolts 46. The front end of the reach is pivotally connected between the upper and lower spanner bars by a king bolt 43.

The front bolster 60 is mounted on the truss of the front axle and connected thereto by the king bolt. The bolster is here shown as provided with stanchions and standards and as of the construction fully described and claimed in my copending application for Letters-Patent of the United States, filed April 17, 1912, Serial No. 691,283.

I claim:—

In a vehicle, an axle, a lower spanner bar on the upper side of the axle, spacer brackets between the axle and lower spanner bar, clip blocks and clip bolts securing the lower spanner bar and the said spacer brackets on the axle, an upper spanner bar having its ends bolted on the lower spanner bar, and spacer brackets between the lower spanner bar and the intermediate portion of the upper spanner bar.

In testimony whereof I affix my signature in presence of two witnesses.

DANIEL T. SEALE.

Witnesses:
H. O. DOWLING,
D. W. MUNN.

Copies of this patent may be obtained for five cents each, by addressing the "Commissioner of Patents, Washington, D. C."